US006474105B1

(12) United States Patent
Gouez et al.

(10) Patent No.: US 6,474,105 B1
(45) Date of Patent: *Nov. 5, 2002

(54) MODULATING A DIAMETER-INCREASING STEP OF A FIBER PREFORM WITH NO MODULATION PRIOR TO A PREDETERMINED DIAMETER

(75) Inventors: Benoît Gouez, Paris (FR); Pierre Ripoche, Pithiviers (FR)

(73) Assignee: Alcatel Cable, Clichy Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 979 days.

(21) Appl. No.: 08/577,764

(22) Filed: Dec. 22, 1995

(30) Foreign Application Priority Data

Dec. 29, 1994 (FR) .......................................... 94 15 867

(51) Int. Cl.⁷ ............................................ C03B 37/027
(52) U.S. Cl. .............................. 65/377; 65/382; 65/391; 65/491
(58) Field of Search .......................... 65/382, 391, 491, 65/402, 377

(56) References Cited

U.S. PATENT DOCUMENTS

| 3,826,560 A | * | 7/1974 | Schultz | 65/421 |
| 4,212,663 A | * | 7/1980 | Aslami | 65/382 |
| 4,294,601 A | | 10/1981 | Dabby | |
| 4,402,720 A | * | 9/1983 | Edahiro | 65/391 |
| 4,478,622 A | * | 10/1984 | Olshansky | 65/421 |
| 4,478,623 A | * | 10/1984 | Olshansky | 65/421 |
| 4,689,212 A | * | 8/1987 | Mansfield | 65/391 |
| 5,192,350 A | * | 3/1993 | LeSergent | 65/382 |
| 5,194,714 A | * | 3/1993 | LeSergent | 65/391 |
| 5,211,732 A | * | 5/1993 | Abbott | 65/421 |
| 5,221,306 A | * | 6/1993 | Fleming | 65/382 |
| 5,522,007 A | * | 5/1996 | Drouart | 65/391 |

FOREIGN PATENT DOCUMENTS

| DE | 3206180 | * | 8/1983 | 65/391 |
| EP | 0153762 A3 | | 9/1985 | |
| EP | 0440130 A1 | | 8/1991 | |
| EP | 0450465 A1 | | 10/1991 | |
| EP | 0484035 A1 | | 5/1992 | |
| JP | 60260429 | * | 12/1985 | 65/491 |
| JP | 3141133 | * | 6/1991 | 65/421 |
| JP | 3228845 | * | 10/1991 | 65/421 |
| JP | 3257037 | * | 11/1991 | 65/421 |
| JP | 4292434 | * | 10/1992 | 65/421 |

OTHER PUBLICATIONS

Patent Abstracts of Japan, vol. 18 No. 322 (C–1214), Jun. 20, 1994, corresponding to JP–A–06 072735 (Furukawa Elec Co Ltd) dated Mar. 15, 1994.
Patent Abstracts of Japan, vol. 16, No. 98 (C–0918), Mar, 11, 1992, corresponding to JP–A–03 279234 (Shin Etsu Chem Co Ltd) dated Dec. 10, 1991.
Patent Abstracts of Japan, vol. 11, No. 307 (C–450), Oct. 7, 1987, corresponding to JP–A–62 096336 (Nippon Telgr & Teleph Corp) dated May 2, 1987.
Database WPI, Section CH, Week 8519, Derwent Publications Ltd., London, GB; AN 85–113440 corresponding to JP–A60 054 934 (Hitachi Cable KK) dated Mar. 29, 1985.

* cited by examiner

Primary Examiner—John Hoffmann
(74) Attorney, Agent, or Firm—Sughrue Mion, PLLC

(57) ABSTRACT

The method includes axially modulating at least one plasma build-up pass in order to improve the opto-geometrical properties of the preform. The modulation preferably takes place during the final passes of plasma build-up and takes place by modulating the build-up grain flow rate. The diameter of the preform is evaluated (6), and a build-up control device (8) regulates grain flow rate (11, 5) in application of the above method.

9 Claims, 4 Drawing Sheets

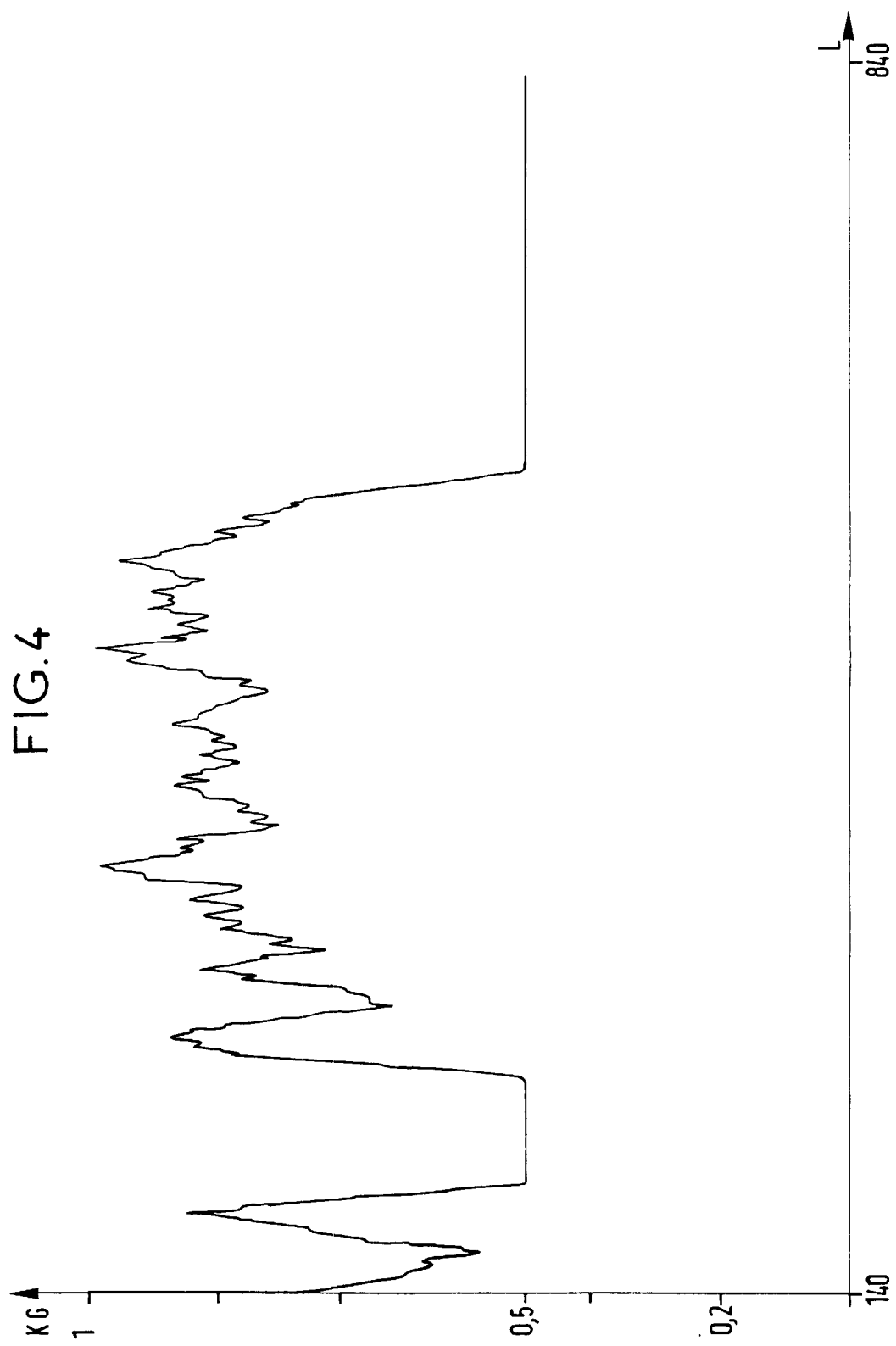

MODULATING A DIAMETER-INCREASING STEP OF A FIBER PREFORM WITH NO MODULATION PRIOR TO A PREDETERMINED DIAMETER

BACKGROUND OF THE INVENTION

The present invention relates to a method of obtaining an optical fiber preform by employing a plasma build-up step. It also covers the preform that results from the method and an optical fiber drawn from the preform.

The manufacture of optical fibers from preforms is conventional. Obtaining a preform by the plasma build-up technique is known; it is described, for example, in patent document EP-450 465 A1.

The opto-geometrical characteristics of a fiber determine its transmission characteristics. These include the shape of the fiber, and in particular the areas of the various concentric portions of the fiber in cross-section, and the optical characteristics of these various portions. Such opto-geometrical characteristics result from the corresponding characteristics of the preform from which the fiber is drawn, after taking account of the effects of fiber-drawing.

An ideal fiber would have nominal and constant opto-geometrical characteristic along its entire length. It would be drawn from a preform that was perfectly cylindrical and that had constant opto-geometrical characteristics along its entire working length.

Unfortunately, in practice, various effects that are difficult to correct in full prevent the above ideal from being achieved. Thus, patent document EP 440 130 A1 mentions not only defects of concentricity, to which no further attention is given herein, but also mentions irregularities in diameter. These are corrected by machining the final preform, thus requiring one or more correction stages, and therefore giving rise to extra cost and loss of efficiency in production. In addition, the correction method concerned relates to preforms obtained directly by the modified chemical vapor deposition (MCVD) method, and not to preforms obtained by plasma build-up.

An object of the present invention is thus to provide a method of obtaining an optical fiber preform using plasma build-up that provides a preform having improved opto-geometrical properties.

SUMMARY OF THE INVENTION

According to a first characteristic of the invention, this object is achieved in that at least one of the plasma build-up passes is modulated in order to improve the opto-geometrical properties of the preform.

The invention is thus based on the principle consisting in modifying the opto-geometrical properties of the preform by acting on the plasma build-up process, and as a result it requires no additional correction stage of step.

According to a characteristic of the invention, said modulated build-up pass is one of the last build-up passes during which, the build-up process being un-modulated, the thickness of the built-up layer as deposited is substantially constant along the entire working portion of the preform.

It has been observed that one of the causes of axial variation in the opto-geometrical properties of preforms obtained in application of known plasma build-up methods lies not only in the primary preform that is to be built up, made by any known method (MCVD, VAD, OVPD, . . . ), but also in the plasma build-up method itself, and specifically in the first plasma build-up passes. Thereafter, still in the known method, the thickness of the plasma build-up layers finally becomes constant. The invention thus provides for acting at this moment on the plasma build-up process so as to correct for any deviations in the opto-geometrical properties of the preform.

More particularly, according to the invention, the build-up process is modulated from a predetermined diameter of the preform.

In another aspect of the invention, the modulated build-up process consists in controlled axial modification of at least one of the plasma build-up parameters, and in particular the flow rate of build-up grains, the temperature of the plasma, or the axial speed of translation of the plasma along the preform. Preferably, the parameter used is build-up grain flow rate.

In addition, according to another aspect of the invention, said controlled axial modification includes evaluating axial errors in the diameter of the preform and axially modifying said parameter so as to cause said modulated build-up pass to reduce said axial errors in diameter. In other words, depending on previously determined axial errors in diameter, the build-up pass is modulated to add to—or remove from—the diameter of the preform so that said errors are made small or even eliminated after the build-up pass.

More precisely, according to the invention, it is possible either:

to reduce the grain flow rate proportionally to said error so as to deposit a layer that is of thickness which decreases with increasing excess diameter;

to reduce the grain flow rate in determined manner as to deposit a layer of reduced thickness where the diameter is too great, thereby bringing it down to a determined value; or else to shut off the flow of grains completely, thereby giving rise to localized removal of matter from the preform by evaporation under the effect of the plasma.

According to yet another aspect of the invention, said evaluation of axial error is performed by axial diameter measurement during a measurement pass, which pass may advantageously coincide with a build-up pass, said axial errors being determined by comparing the results of said measurement with a reference profile.

In a first implementation, said reference profile comprises the minimum axial diameter observed during said measurement pass. That corresponds to errors relative to a cylindrical shape. However, in a second implementation, said reference profile also comprises an axial correction term for the diameter derived from measurements performed on the preform prior to plasma build-up. This makes it possible to take account of and to correct anomalies in the opto-geometrical characteristics of the preform that stem from stages prior to plasma build-up, such as tapering or central thinning of the core of the preform relative to its outside diameter.

The present invention also provides a preform and a fiber drawn from such a preform, having a partial build-up layer structure that results from application of the method as described above for obtaining an optical fiber preform.

BRIEF DESCRIPTION OF THE DRAWINGS

The present invention will be better understood from the description given below by way of non-limiting example of a particular implementation, and given with reference to the accompanying drawings, in which:

FIG. 4 is a curve illustrating application of the flow chart of FIG. 2.

DETAIL DESCRIPTION OF THE INVENTION

Figure 1:
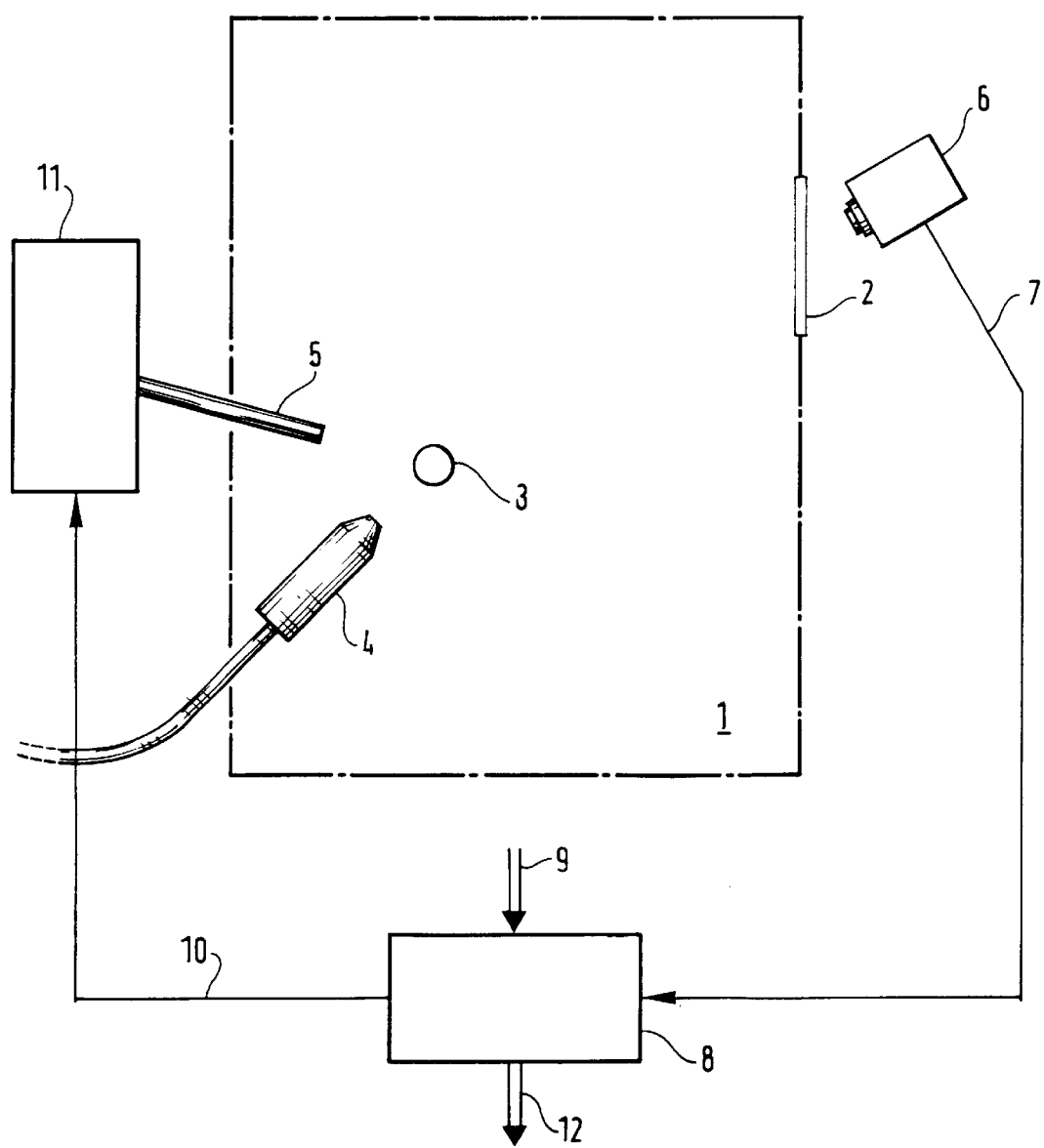
FIG. 1 is a block diagram of plasma build-up equipment in which the invention can be implemented.

FIG. 1 is a very general block diagram showing plasma build-up equipment in which the invention can be applied.

The equipment comprises an enclosure 1 provided with a transparent window 2 and containing a preform 3 (seen end-on) towards which there are directed both a plasma torch 4 and a nozzle 5 for feeding build-up grains. Outside the enclosure, a CCD camera 6, disposed behind the window 2, looks at the preform 3. It provides a measure of the diameter of the preform at the location on which it is aimed, in the form of a value which is transmitted over a link 7 to a build-up process control device 8. Over a multiple link 9, the control device 8 receives other indications concerning the conditions under which the build-up process is taking place. A program internal thereto for controlling the build-up process causes the device 8 to deliver a grain flow rate control value over an output link 10 to a grain flow rate measuring device 11 which feeds the nozzle 5 accordingly. The device 8 has a multiple outlet link 12 over which it delivers other control values defining other performance aspects of the control process.

All of the items of equipment shown in FIG. 1 are well known in the art. Other items (not shown) are likewise well known. Thus, there are preform support means that serve to move it in rotation and in translation, a carriage for supporting the plasma torch 4, and the nozzle 5, and means for moving it in translation parallel to the longitudinal axis of the preform 3, together with means for evaluating the angular position of the preform and the longitudinal position of the carriage, as described in above-mentioned document EP 440 130 A1. Means enable the camera 6 to be pointed at successive locations along the preform 3 during a measurement pass, which means may be implemented by a second displacement carriage coupled to the above-mentioned first carriage and likewise belonging to the prior art. By way of example, the grain flow rate control mechanism may be a mechanism that operates by weight using a strain gauge and a wormscrew, or it may be a vibrating auger.

Plasma build-up takes place in passes, from right to left and then from left to right, during which the plasma torch 4 and the nozzle 5 scan along the length of the reform.

Simultaneously, the camera 6 performs a measurement pass and delivers successive values for the diameter of the preform 3 along its entire length. For simplification purposes, it is preferable for the camera to perform measurement during every other pass only, e.g. on a right-to-left pass, while during each subsequent pass, the output from the camera is not enabled. The required measurement values are then obtained by extrapolation, as described below.

Figure 2:
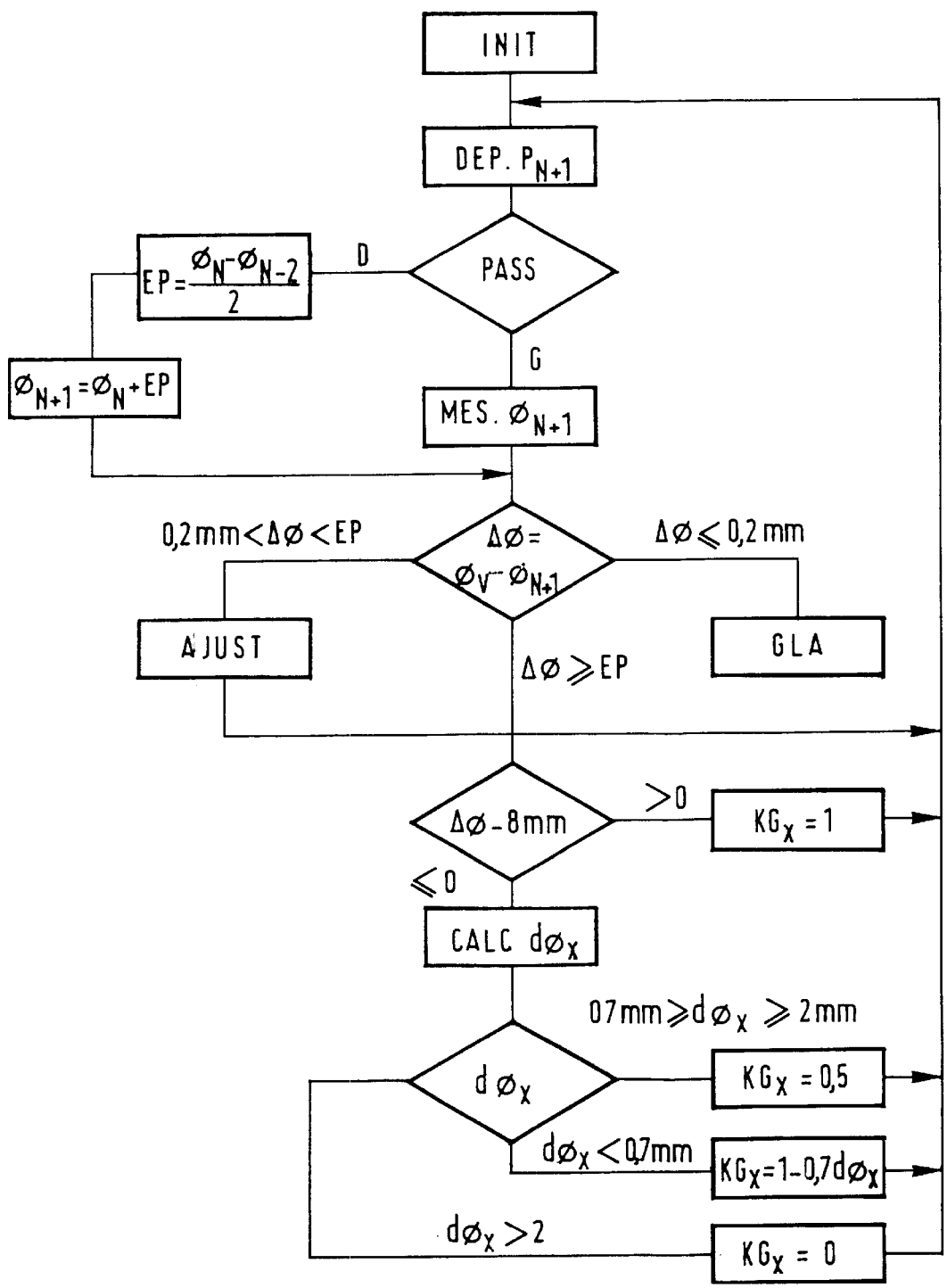
FIG. 2 is a flow chart describing a plasma build-up process including an implementation of the invention.

With reference now to FIG. 2, an implementation of the method of the invention for obtaining a preform is described. This flow chart shows the essential steps in the build-up process.

The build-up process begins by an initialization step, marked INIT, during which the various build-up parameters are established and in which the process control device waits for certain process implementation conditions to be achieved, e.g. a defined temperature within the enclosure 1 or of the preform 3.

Once the above conditions are satisfied, the build-up process begins by a first pass in which N=0, which pass is referenced $P_1$.

The pass number is then examined in a step marked PASS and it consists alternately in a right-to-left pass marked G, and in a left-to-right pass, marked D.

During a G pass, build-up is accompanied by a measurement pass, marked MES.$\emptyset_{N+1}$, which provides a sequence of incremental values for the preform diameter from one end to the other. A mean diameter value $\emptyset_{N+1}$ is derived from these values, which mean value may be the arithmetic mean of the values measured along the working length of the preform.

The working length is the length between two end portions of the preform, each occupying about 10 cm, which has opto-geometrical characteristics that are sufficiently uniform to provide a fiber of the desired quality.

During a D pass, no measurement pass takes place. However preform diameter values are still required and these are obtained by extrapolation from the measurement values picked up during earlier G passes. Initially, such values are not available, but that does not matter, as is explained below.

After two G passes, the following D pass includes a calculation step that delivers EP=½($\emptyset_N-\emptyset_{N-2}$). The value $\emptyset_N$ is the mean diameter as recorded during the preceding pass which was a G pass. The value $\emptyset_{N-2}$ is the value of the G pass before the preceding G pass. The difference $\emptyset_N-\emptyset_{N-2}$ is the mean thickness deposited in two passes. EP is thus the mean thickness deposited during each of the two preceding passes. When added to $\emptyset_N$, it provides a linear extrapolation of what ought to be the diameter along the preform assuming that a measurement was taken during a D pass.

In the following step, a value $\Delta\emptyset=\emptyset_V-\emptyset_{N+1}$ is calculated. $\emptyset_V$ is the intended diameter that the final preform ought nominally to have. The difference $\Delta\emptyset$ is the thickness that remains to be deposited. This thickness is evaluated. If $\Delta\emptyset \leq 0.2$ mm, then the diameter of the preform is close enough to the desired diameter for the build-up process to be interrupted, as indicated by the step marked GLA. If 0.2 mm<$\Delta\emptyset$<EP, then the thickness of at least one more pass is required. Under such circumstances, the step ADJUST is performed to adjust the flow rate of grains to a small value so that, at constant flow rate over one or two passes, $\Delta\emptyset \leq 0.2$ mm is achieved, thereby terminating the build-up process.

If $\Delta\emptyset \geq$ EP, then the build-up process can continue over at least one more complete pass.

Preform diameter evaluation is then performed.

If $\Delta\emptyset-8$ mm$\leq 0$, the build-up process has not yet reached the stage where it is useful to start correcting for opto-geometrical errors of the preform. The grain flow rate KG is then set to its nominal value of KG=1. Pass $P_{N+1}$ is accomplished at a constant flow rate equal to said nominal value. This continues from the beginning of the build-up process until $\Delta\emptyset-8$ mm=0. It can thus be seen that at the beginning of the process, so long as the above stage has not been reached, it does not matter whether or not it is possible to establish an approximately accurate value for the mean diameter of the preform during a pass D.

When $\Delta\emptyset-8$ mm$\leq 0$, then the build-up process is modulated axially during at least one build-up pass, but usually during several such passes, for the purpose of improving the opto-geometrical properties of the preform.

In the example of FIG. 2, this is achieved in that initially a step is applied during which the diameter error $d\emptyset_x$ that is to be corrected is calculated, which step is marked CALC $d\emptyset_x$.

This calculation step which is performed in the control device 8 of FIG. 1, consists in a first example in evaluating the diameter along the preform, in determining its minimum diameter, and in calculating for each point along the preform its error, i.e. the excess diameter of the point relative to the minimum diameter. The set of values obtained in this way, written $d\emptyset_x$, where x corresponds to an axial dimension along the preform, is used to modulate in the axial direction at least one of the plasma build-up parameters. In this implementation, the modulated parameter is the grain flow rate KG, however it is clear that it would also be possible to work on the translation speed of the support carriage or on the flow rate of fluids delivered to the plasma torch, or indeed on other parameters.

Furthermore, in an embodiment of the invention, the error may be computed in more general form by evaluating axial diameter errors on the basis of measured opto-geometrical properties of the preform obtained at any stage of the build-up process, e.g. before the beginning of the process, and thus defining a reference profile, with the sequence of diameters that the preform is to achieve along its working length being determined so as to possess opto-geometrical properties such that after fiber drawing, the resulting optical fiber has the desired constant opto-geometrical characteristics. The errors are used for modulating plasma build-up as in the above example.

In the implementation of FIG. 2, plasma build-up is modulated as a function of the error value:

if $d\emptyset_x$<0.7 mm, then grain flow rate is reduced to $KG_x$= 1−0.7 $d\emptyset_x$; and the correction can take place in a single pass;

if $d\emptyset_x$ lies in the range 0.7 mm to 2 mm, then the correction requires two or more passes; to avoid introducing excessive non-uniformities in the build-up process, grain feed rate is set to half the nominal rate; and if $d\emptyset_x$ is greater than 2 mm, then the process is being applied to one of the end portions of the preform whose thickness is initially significantly greater than it is along the working length of the preform, so the flow of grains is interrupted; under such conditions, the plasma will evaporate a fraction of the excess thickness on each pass.

Figure 3:
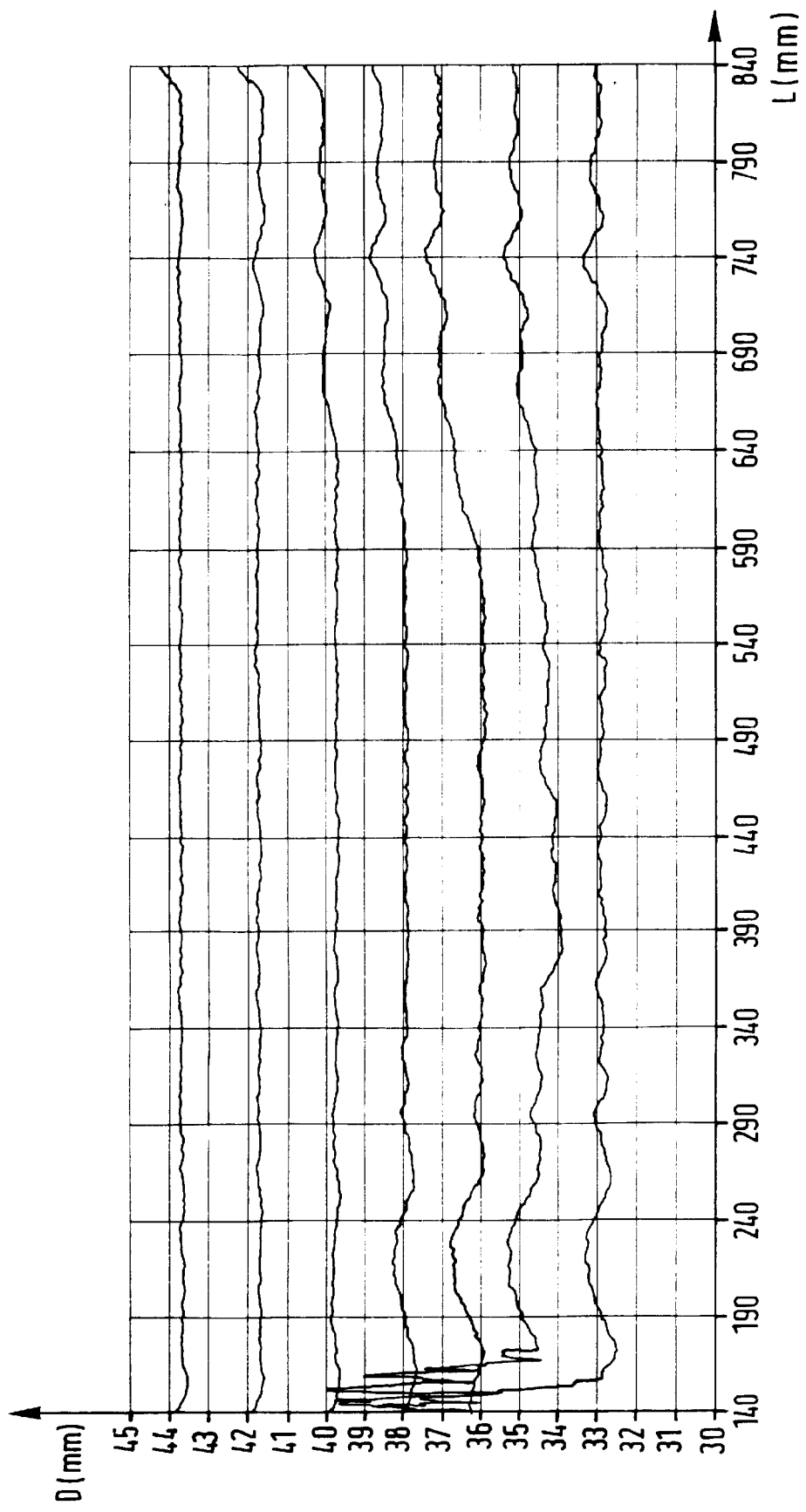
FIG. 3 is a set of curves showing the diameter along a preform and illustrating the effect of the invention.

The effect of the above-described method of obtaining an optical fiber preform is illustrated by the curves of FIG. 3, each of which shows the diameter (D) of the preform over its working length (L), starting at 140 mm and continuing to 840 mm.

The bottom curve shows that when the measured diameter reaches 33 mm to 35 mm, considerable amounts of irregularity are to be observed, particularly around 200 mm and around 740 mm. The error correction method is then implemented. Thereafter, the effect of modulating build-up reduces differences in diameter during the various passes at diameters of about 38 mm, 40 mm, 42 mm, and 44 mm so that prior to the last pass, the diameter has become substantially constant along the entire working length of the preform.

As an illustration, FIG. 4 shows the grain flow rate setpoint KG during the pass at about 36 mm in FIG. 3. It can be seen that the flow rate which occasionally reaches 1 for those few axial points of zero error, is modulated in proportion to the error over a major portion of the total length and drops to 0.5 when the error is excessive.

Naturally the above description is given purely by way of non-limiting example and numerical values, in particular, may vary depending on the particular implementation under consideration.

What is claimed is:

1. A method of obtaining an optical fiber preform by employing build-up, the method comprising the following steps:

(a) providing an elongated preform in an enclosure;
   (b) successively forming layers of preform material on said preform by depositing said preform material along a length of said preform with a preform material depositing means in a plurality of discrete, successive build-up passes to increase a diameter of said preform;
   (c) monitoring the diameter of said preform to detect variation in the diameter along the length of said preform; and
   (d) modulating at least one build-up parameter of said preform material depositing means along the length of said preform based on said monitoring step for at least one of said build-up passes, wherein said modulating step is initiated when said preform reaches a predetermined diameter irrespective of whether the monitoring step detects variations in the diameter along the length of said preform during formation of said layers when the diameter is less than said predetermined diameter;

wherein said modulating step occurs during at least one of said build-up passes which is preformed when the diameter of said preformed is above said predetermined diameter.

2. A method according to claim 1 of obtaining an optical fiber preform, wherein said modulating step includes controlled axial modification of said at least one plasma build-up parameter along the length of said preform so as to provide controlled axial correction to opto-geometrical characteristics of the preform.

3. A method according to claim 2 of obtaining an optical fiber preform, wherein said at least one plasma build-up parameter is a grain flow rate.

4. A method according to claim 2 of obtaining an optical fiber preform, wherein said controlled axial modification comprises evaluating the diameter of the preform along the length thereof and in modifying said at least one plasma build-up parameter in such a direction that said modulated build-up pass provides a correction in diameter.

5. A method according to claim 4 for obtaining an optical fiber preform, wherein said modified parameter is grain flow rate and said grain flow rate modification is performed as a function of an amplitude of a difference between measured diameters along the length of said preform, said modification selected from a group consisting of:

a reduction in said grain flow rate proportional to said correction in diameter;
   a fixed reduction in said grain flow rate; and
   a total interruption of said grain flow.

6. A method according to claim 4 of obtaining an optical fiber preform, wherein said evaluation takes place by axially measuring the diameter during a measurement pass and in determining differences in diameter by comparison between the measured diameter and a reference profile.

7. A method according to claim 6 of obtaining an optical fiber preform, wherein said reference profile has a minimum axial diameter measured during said measurement pass.

8. A method according to claim 7 of obtaining an optical fiber preform, wherein said reference profile also comprises an axial correction term based on a diameter of the preform prior to plasma build-up.

9. A method according to claim 6 for obtaining an optical fiber preform, wherein said measurement pass coincides with a said build-up pass.

* * * * *

UNITED STATES PATENT AND TRADEMARK OFFICE
CERTIFICATE OF CORRECTION

PATENT NO.    : 6,474,105 B1                          Page 1 of 1
DATED         : November 5, 2002
INVENTOR(S)   : Benoit Gouez and Pierre Ripoche It is certified that error appears in the above-identified patent and that said Letters Patent is hereby corrected as shown below:

<u>Title page,</u>
Item [73], change Assignee from "Alcatel Cable" to -- Alcatel Fibres Optiques --

Signed and Sealed this

Fifteenth Day of July, 2003

JAMES E. ROGAN
*Director of the United States Patent and Trademark Office*